US005479773A

United States Patent [19]

[11] Patent Number: 5,479,773

[45] Date of Patent: Jan. 2, 1996

McCoomb et al.

[54] TANGENTIAL AIR ENTRY FUEL NOZZLE

[75] Inventors: Edward J. McCoomb, Springfield, Mass.; Thomas J. Rosfjord, South Windsor, Conn.; Michael P. Ross, Ellington, Conn.; Timothy S. Snyder, Glastonbury, Conn.; Steven A. Lozyniak, South Windsor, Conn.

[73] Assignee: United Technologies Corporation, Hartford, Conn.

[21] Appl. No.: 322,629

[22] Filed: Oct. 13, 1994

[51] Int. Cl.[6] .......... F02C 7/32

[52] U.S. Cl. .......... 60/39.32; 60/748; 239/397.5; 239/431

[58] Field of Search .......... 60/39.23, 748, 60/740, 737, 39.32, 738, 742, 743; 239/424.5, 434, 426, 431, 397.5, 132.5

[56] References Cited

U.S. PATENT DOCUMENTS

| | | | |
|---|---|---|---|
| 2,955,415 | 10/1960 | Long | 239/397.5 |
| 4,426,841 | 1/1984 | Cornelius et al. | 60/39.23 |
| 4,587,809 | 5/1986 | Ohmori et al. | 60/748 |
| 4,781,030 | 11/1988 | Hellat et al. | 60/743 |
| 4,813,608 | 3/1989 | Holowach et al. | 60/39.32 |
| 4,891,935 | 1/1990 | McLaurin et al. | 239/397.5 |
| 5,081,844 | 1/1992 | Keller et al. | 60/737 |
| 5,154,059 | 10/1992 | Keller | 60/737 |
| 5,253,810 | 10/1993 | Maltby et al. | 239/397.5 |
| 5,307,634 | 5/1994 | Hu | 60/737 |
| 5,375,995 | 12/1994 | Dobbeling et al. | 60/748 |

*Primary Examiner*—Timothy S. Thorpe
*Attorney, Agent, or Firm*—Edward L. Kochey

[57] ABSTRACT

The two scrolls 22 forming air inlet slot 20 are each formed of a fixed vane 36 and a floating vane 38. The thin and hot floating vane 38 is secured to the massive and cooler fixed vane 36 with a longitudinal slidable joint 42. The floating vane may expand without restraint of the fixed vane, so that buckling is avoided and inlet slot 20 is uniform.

6 Claims, 4 Drawing Sheets

FIG. 4
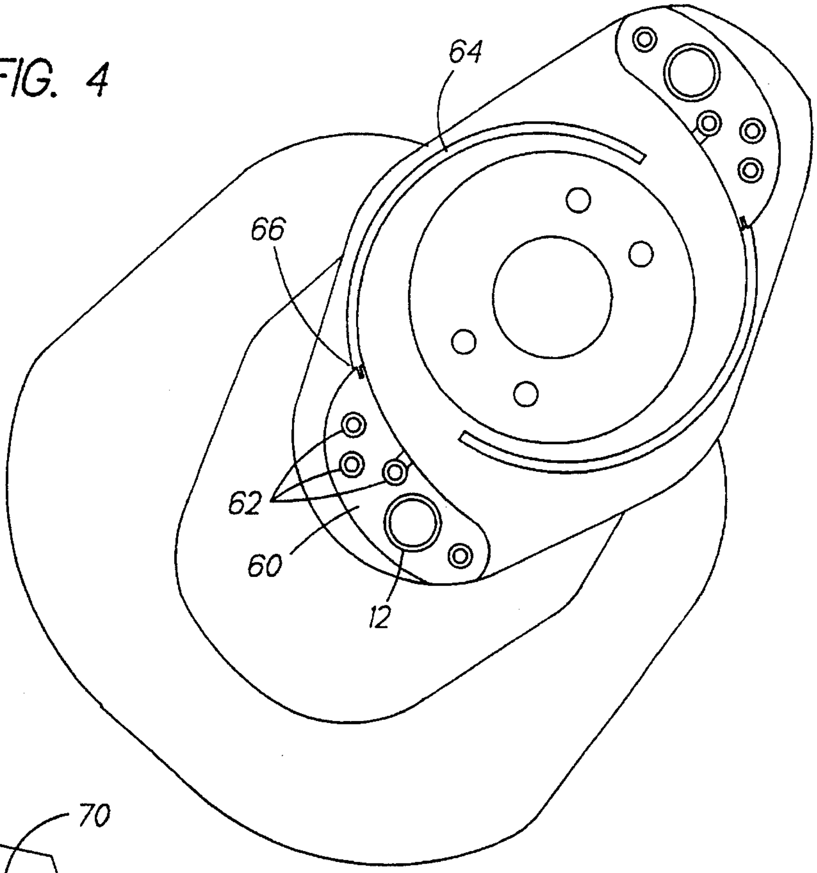
FIG. 5
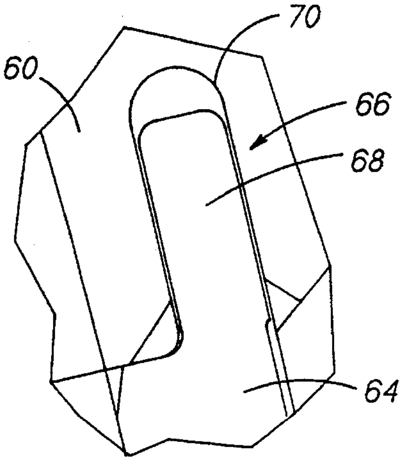
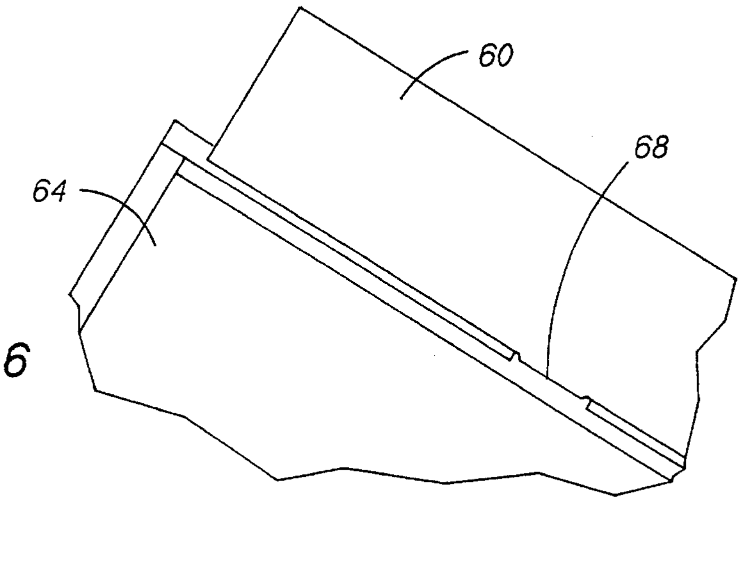
FIG. 6

TANGENTIAL AIR ENTRY FUEL NOZZLE

TECHNICAL FIELD

The invention relates to low NOx premix fuel nozzles, and in particular to an arrangement for an air inlet scroll.

BACKGROUND OF THE INVENTION

Combustion at high temperature leads to the formation of NOx, or oxides of nitrogen, because of the combination of oxygen with nitrogen at the high temperature. This is a notorious pollutant and much effort is being put forth to reduce the formation of NOx.

One solution has been to premix the fuel with excess air whereby all of the combustion occurs with local high excess air. The combustion therefore occurs at relatively low temperature minimizing the formation of NOx.

A nozzle of this type is shown in U.S. Pat. No. 5,307,634 where the fuel nozzle consists of a scroll air swirler with a conical center body. The scroll swifter is made from two offset cylindrical-arc scrolls attached to two endplates. Air enters the swifter through two rectangular slots formed by the scroll offset, and exits through one endplate into the combustor by a circular hole, with the diameter substantially equal to the inscribed circle of the scrolls. Fuel is injected into the airflow at each inlet from a manifold fed linear array of orifices located on the outer scroll opposite the inner trailing edge.

This is intended to establish a uniform fuel air mixture before exit into the combustor for combustion. The portion the scroll containing the fuel entry manifold is relatively massive and cooled by the fuel itself. The trailing edge of the scroll is thin to permit the smooth flow of air thereover, and is cooled only by the hot air while it is exposed to radiation from the combustor. It is been found that because of the differential expansion between the massive cool portion of the scroll and the thin hot portion of the scroll buckling of the thin portion at the discharge end occurs. This produces variations in the flow area for the incoming air and accordingly sets forth a maldistribution of the air/fuel ratio at local areas. These areas may be local within a single nozzle or local to one of several parallel nozzles. It is desirable to maintain inlet geometry without distortion so that a uniform air/fuel mixture can be obtained.

SUMMARY OF THE INVENTION

The tangential air entry fuel nozzle has a longitudinal axis and two cylindrical-arc scrolls with the centerline of each offset from that of the other. Overlapping ends of these scrolls form an air inlet slot therebetween for the introduction of an air/fuel mixture into the fuel nozzle. A combustor end endplate has a central opening for air and fuel egress while a remote end endplate exists blocking the nozzle flow area at the other end. The scrolls are secured between these endplates.

Each scroll has a fixed vane and a floating vane. The fixed vane is rigidly secured to the endplates and contains the fuel supply conduit. The floating vane is secured to the corresponding fixed vane in a manner which is longitudinally slidable throughout at least the vast majority of its length. Unrestricted longitudinal differential expansion between the cold fixed vane and the hotter floating vane is permitted. This avoids the buckling and distortion of the floating vane so that the air inlet flow area remains uniform.

BRIEF DESCRIPTION THE DRAWINGS

FIG. 4 is a section through an alternate scroll looking away from the combustor;

FIG. 5 is a detail of the joint between vanes for the FIG. 4 embodiment; and FIG. 6 is a view showing a brazed retention arrangement of the FIG. 4 embodiment.

DESCRIPTION OF THE PREFERRED EMBODIMENTS

Figure 1:
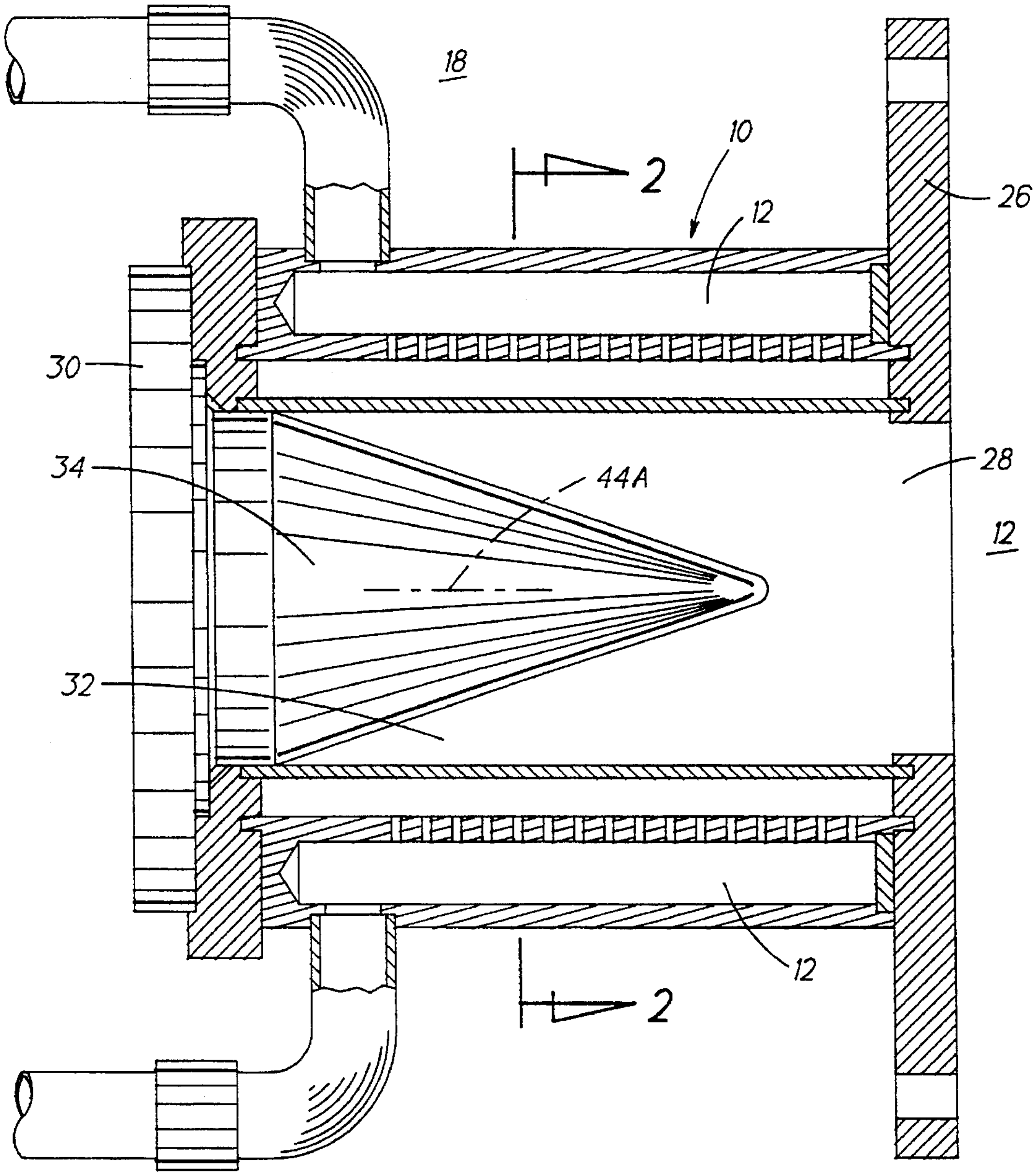
FIG. 1 is a longitudinal section through the nozzle.
Figure 2:
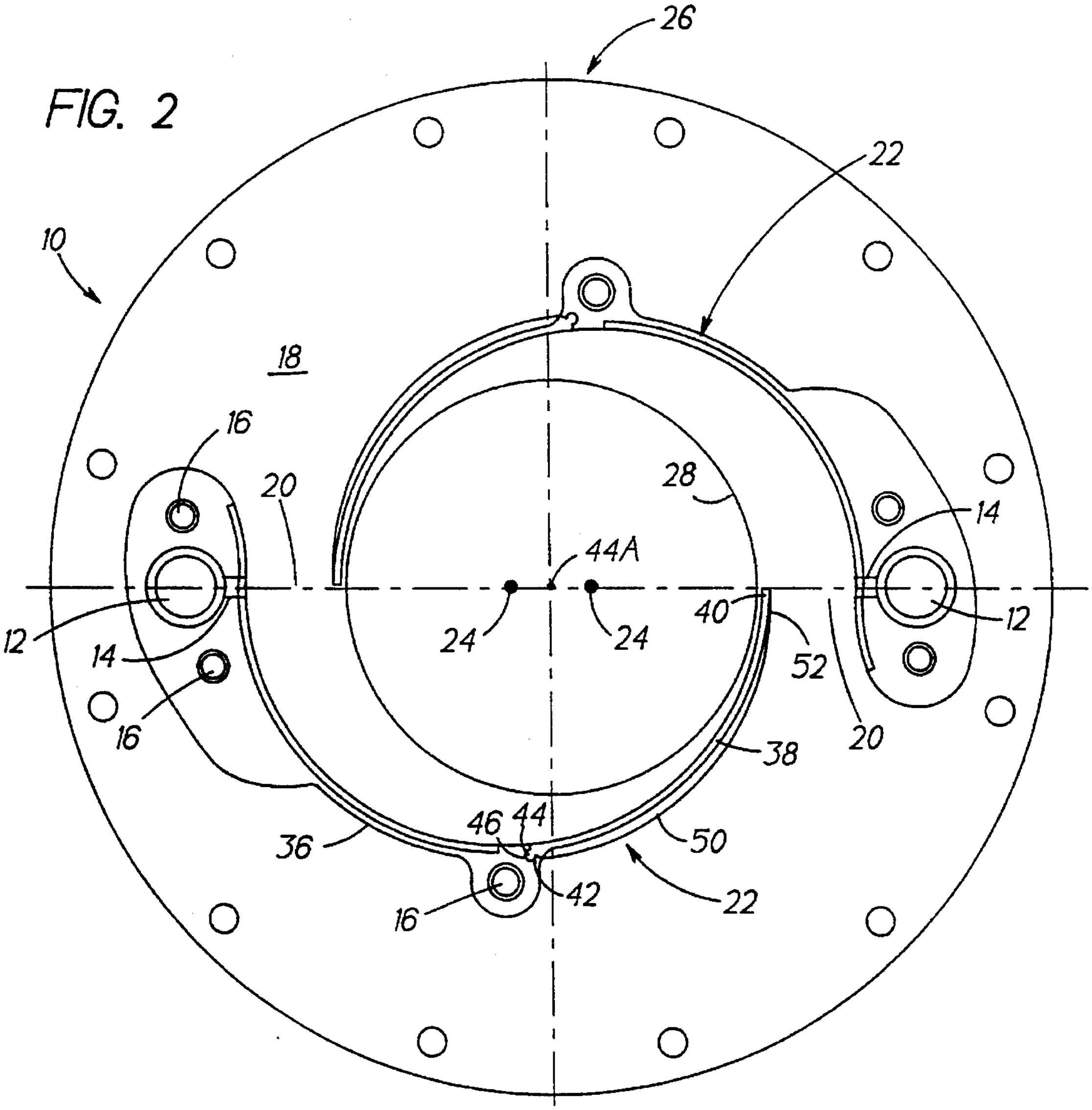
FIG. 2 is a section looking toward the combustor taken along section 2—2 of FIG. 1.

Referring to FIGS. 1 and 2 the low NOx premix fuel nozzle 10 is arranged to discharge into combustor 12 where combustion of the fuel takes place. Gas fuel conduits 12 supply a gaseous fuel which is discharged through a plurality of orifices 14 for premixing with an incoming air stream.

Alternate liquid fuel supply lines 16 also exists whereby liquid fuel can be alternately or cumulatively supplied with the gas.

Combustion supporting air from chamber 18 passes through inlet slot 20. This air inlet slot is formed by two cylindrical-arc scrolls 22 with offset centerlines 24. The overlapping ends of the scrolls form the air inlet slot 20.

Combustor end endplate 26 has a central opening 28 for the egress of the air fuel mixture. A remote end endplate 30 is located at the other end of the scroll and blocks the other end of swirl chamber 32. A conical center body 34 is located within chamber 32 tapering toward the axis to theoretically place the apex near the end of the tangential inlet slots. In practice a shorter, radiused tip is used.

At maximum rating of the gas turbine the air temperature 18 is 900° F. while the temperature of the gaseous fuel in manifold is 12 is 200° F. Liquid fuel when supplied through conduits 16 is approximately 150° F. Portions of the scroll 22 are also exposed to radiation from the combustor 12 and therefore reach an even higher temperature level than 900° F. The scroll 22 is divided into a fixed vane 36 and a floating vane 38. The fixed vane 36 is the portion which is relatively massive and also cooled by fuel passing therethrough. The floating vane 38 is cooled only by the high temperature air and is more broadly exposed to radiation from the combustor. The floating vane therefore tends to expand more than the fixed vane and this is exacerbated since the material is frequently a material such as Hastalloy™ alloy which has a different coefficient of expansion than the stainless steel used for the fixed vane.

The tip 40 of the vane requires a precise location to establish a uniform flow area of slot 20. A longitudinal slidable joint 42 is supplied between a fixed vane and the sliding vane to permit longitudinal differential expansion in a direction parallel to axis 44A of the nozzle. The joint illustrated in FIG. 2 is a cylinder and socket joint with cylinder 44 fitting within socket 46. This joint can be free throughout its entire length. It operates to permit the longitudinal expansion while resisting circumferential movement of the floating vane with respect to the fixed vane.

Figure 3:
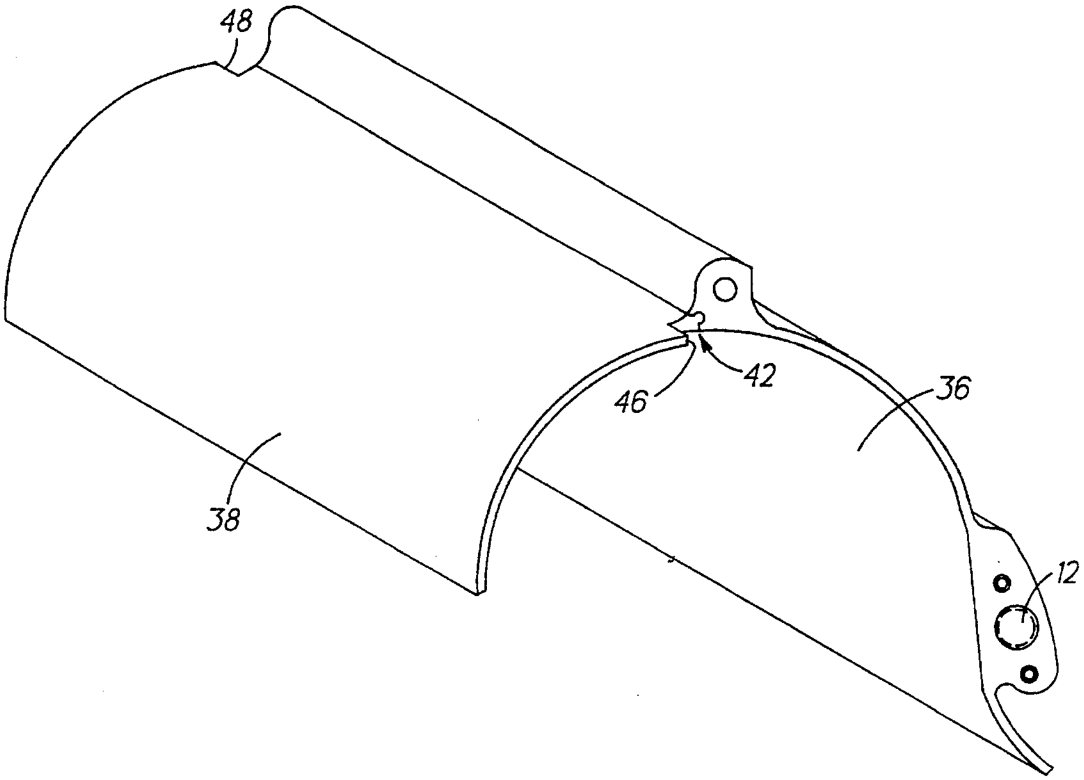
FIG. 3 is a isometric view of the scroll with the fixed vane and the floating vane.

Referring to FIGS. 2 and 3 it can be seen that the floating vane 38 has an extension 46 on one end and an extension 48 on the other end. The combustor end endplate has a slot 50 therein which receives the extension 46 of the floating vane. This slot is only slightly greater than the width of the floating vane where the slot engages the tip edge 40 of the vane.

Throughout the balance of the arcuate slot it is wider. This provides tight control on the size of the opening of slot 20 with the close fit at that location, while permitting variations in the bending or arc of the floating vane 38 throughout the remainder of the arc.

FIG. 4 is a view of an alternate embodiment which is a section through a nozzle looking away from the combustor. Gas manifold 12 is located in a fixed vane 60 which is of a rather short arc because the oil manifolds 62 are all located in this area. The floating vane 64 is therefore much longer in the circumferential direction being almost 180°. Furthermore the joint 66 as shown in FIG. 5 is a tongue and groove joint of close clearance with tongue 68 on floating vane 64 fitting within groove 70 in fixed vane 60. This joint should be reasonably snug to eliminate excess leakage. The joint cannot operate to restrain circumferential movement of the floating vane 64 with respect to the fixed vane 60. This is accomplished by the groove in the endplate as described in the first embodiment.

The looseness of the floating vane within the fixed vane 60 may permit longitudinal vibration and concomitant wear. Accordingly, in the alternate embodiment as illustrated in FIG. 6 a brazed joint 68 is located around the midpoint of the two vanes and extends for approximately one inch. The differential expansion within this one inch section can be tolerated without buckling of the structure and so long as the floating vane is located with respect to the endplates in a manner to provide sufficient clearance, construction without buckling of the end of the floating vane is achieved.

We claim:

1. A tangential air entry fuel nozzle having a longitudinal axis, comprising:

two cylindrical-arc scrolls having the center line of each offset from the other, overlapping ends of said scrolls forming an air inlet slot therebetween;

a combustor end endplate having a central opening for air and fuel egress;

a remote end endplate;

said scrolls each secured between said endplates;

each scroll having a fixed vane and a floating vane, said fixed vane containing a fuel supply conduit and fixedly secured to said endplates; and each floating vane secured to a corresponding fixed vane, longitudinally slidable throughout at least the vast majority of it's length, whereby unrestricted longitudinal differential expansion between said fixed vane and said floating vane is permitted.

2. A fuel nozzle as in claim 1 further comprising:

each floating vane having a guide against rotation around the connection to said fixed vane.

3. A fuel nozzle as in claim 2 wherein:

said guide comprises arcuate guide slots in said endplates, said floating vane fitting within said slots.

4. A fuel nozzle as in claim 3 further comprising:

each floating vane having a supported secured to said fixed vane and a tip edge at the opposite end of said floating vane; and said guide slots having a width only slightly greater than said floating vane where said guide slots engage the tip edge of said floating vane, but having greater width throughout the balance of said guide slots.

5. A fuel nozzle as in claim 1 further comprising:

each floating vane secured through a corresponding fixed vane with a cylinder and socket joint.

6. A fuel nozzle as in claim 1 further comprising:

each floating vane secured to a corresponding fixed vane with a snug tongue and groove joint; and the end of said guide slot abutting said floating vane to prevent circumferential movement of said floating vane.

* * * * *